Figure 1:
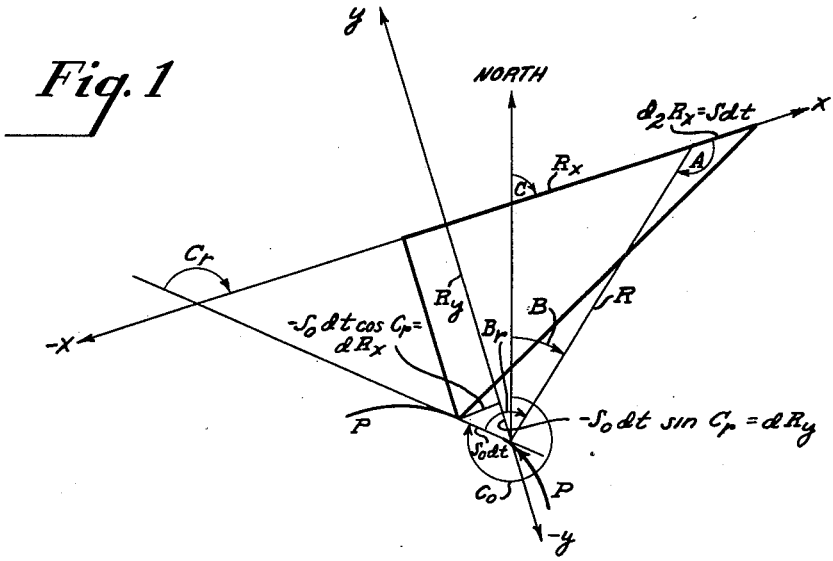

June 10, 1952 W. K. ERGEN 2,600,159
COURSE INTERCEPTION NAVIGATIONAL COMPUTER
Filed Aug. 13, 1948 2 SHEETS—SHEET 1

Inventor
William K. Ergen
By
Morris A. Rabin
Attorney

June 10, 1952  W. K. ERGEN  2,600,159
COURSE INTERCEPTION NAVIGATIONAL COMPUTER
Filed Aug. 13, 1948  2 SHEETS—SHEET 2
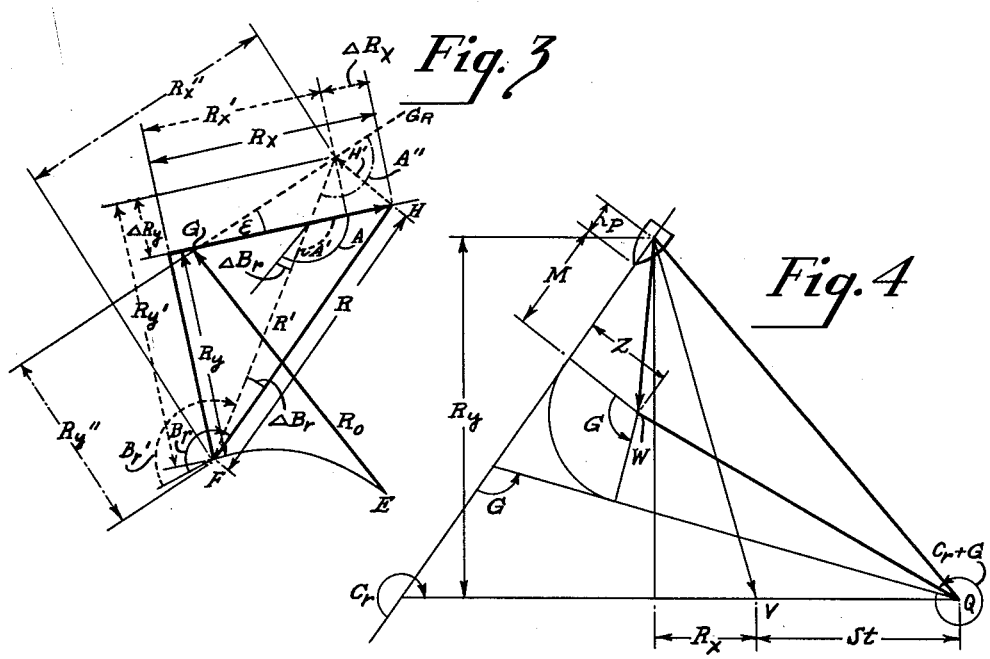
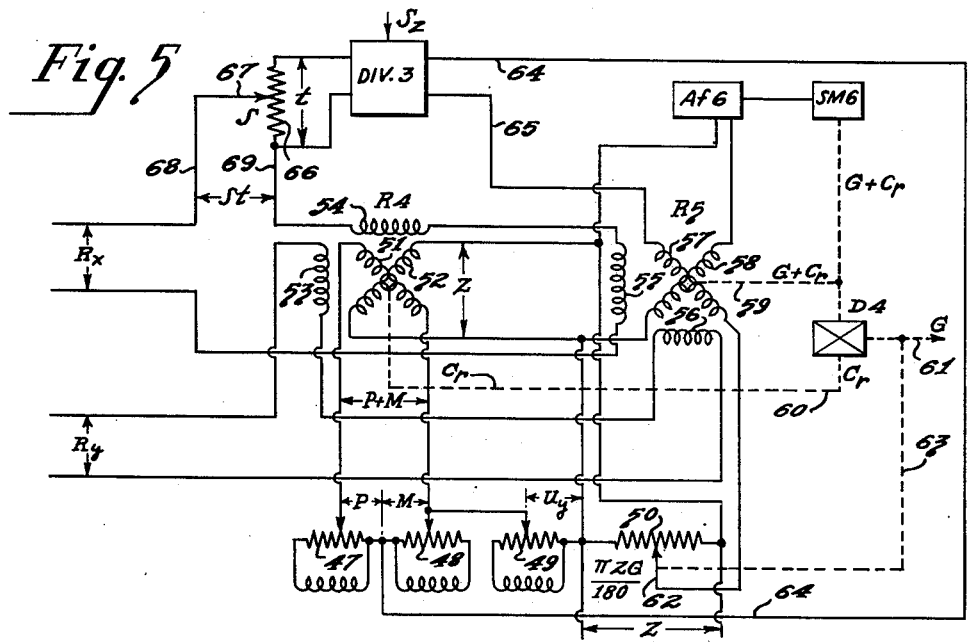
Inventor
William K. Ergen
By Morris Rabkin
Attorney Patented June 10, 1952

2,600,159

UNITED STATES PATENT OFFICE 2,600,159

COURSE INTERCEPTION NAVIGATIONAL COMPUTER

William K. Ergen, Oak Ridge, Tenn., assignor to Radio Corporation of America, a corporation of Delaware Application August 13, 1948, Serial No. 44,203

3 Claims. (Cl. 235—61.5)

This invention relates to navigation computers which are adapted to provide data in accordance with which a gyroscope controlled vessel is launched from one moving vessel in a manner to intercept the course of another moving vessel. For convenience of expression, the gyroscope controlled vessel is hereinafter sometimes called a guided vessel, the vessel from which it is launched is called a mother vessel and the vessel to be contacted is called a target vessel.

For the purpose of illustration, the invention is herein disclosed as applied to the problem of presetting the gyroscope in a torpedo or other guided vessel in such a way that it will hit a target vessel.

The improved navigation computer by which this result is achieved is designed to cooperate with various parts of the mother vessel's equipment such as the periscope, the radar, and the sonar, as well as the compass and the speedometer. It includes a position keeper, and a group of angle solvers.

The position keeper provides data with respect to the estimated position of the target vessel. The angle solvers continuously compute the proper angle of the torpedo gyroscopes on the basis of information obtained from the position keeper.

The principal object of the invention is to provide an improved navigation computer and method of operation whereby a torpedo or guided vessel may be launched from a moving vessel in such a way as to bring it into contact with another moving vessel. Another object is to provide an improved computer which (1) responds to positional data taken at times separated by random intervals and (2) functions to compute continuously the position of a target vessel during such random intervals. Another object is to provide an improved computer which functions in response to a first set of positional data to compute continuously the position of a target vessel and functions in response to a subsequent set of positional data to correct such computed position in accordance with such subsequent set of positional data.

The invention will be better understood from the following description considered in connection with the accompanying drawings and its scope is indicated by the appended claims.

Figure 2:
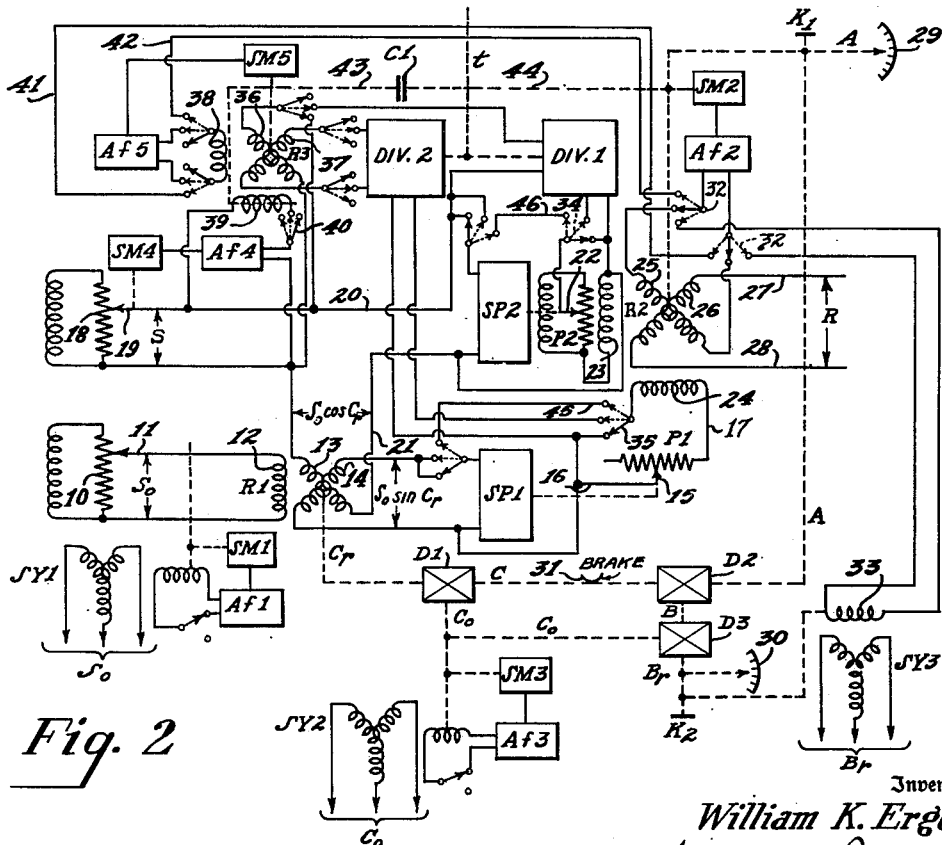

Referring to the drawings:

Fig. 1 is an explanatory diagram relating to the operation of the position keeper, Fig. 2 is a wiring diagram of the position keeper, some of the parts being shown as boxes bearing explanatory legends, Fig. 3 is an explanatory diagram relating to the process of correcting the computed position of the target vessel in response to an observed set of data, Fig. 4 is an explanatory diagram relating to the operation of the angle solver, and Fig. 5 is a wiring diagram of the angle solver assembly by which the launching of the guided vessel is controlled.

The position keeper is required because the mother vessel does not continuously observe the position of the target vessel. The observations are made at intervals chosen by the operator of the equipment of the mother vessel. Between any two such observations, the position keeper computes and indicates the range R and the relative bearing $B_r$ (see Fig. 1) of the target vessel. R is the distance from the mother vessel to the target, and $B_r$ the angle between the heading of the mother vessel and the line from the mother vessel to the target counted clockwise from the bow of the mother vessel. More specifically, the location of the periscope, radar or sonar is assumed to represent the location of the mother vessel. The computation of R and $B_r$ is based upon known or estimated initial values of R and $B_r$. The motion of the mother vessel may be irregular, but its speed and direction are constantly known from the speedometer and compass. The target vessel is assumed to move on a straight course at constant speed. The direction of this course and the absolute value of the target vessel's speed are estimated and used in the computation of R and $B_r$.

During an observation, the position keeper allows a comparison between the actual values of R and $B_r$, and the values computed on the basis of the estimated speed and direction of the target vessel. Any difference between the actual and estimated values is used by the position keeper to correct the estimated values of target speed and direction. These corrected values correspond then to the average during the period between the last two observations, and the corrected values are used as the new estimates for the period until the next observation.

In designing the position keeper, it is desirable to resolve the various vectors with respect to reference axes which have some importance for the associated problems. The only reference axis which remains fixed between two observations and at the same time has some importance for the associated problems is the heading of the target vessel which is assumed to move between observations on a straight course at constant speed.

The vectors of Fig. 1 are resolved with respect to the heading of the target vessel. Thus the assumed heading is called the $x$-axis, and the direction 90° counterclockwise from the $x$-axis is the $y$-axis. In Fig. 1, the range R appears resolved into the components $R_x$ and $R_y$. Due to the motion of the mother vessel (generally along a curved path) the $R_x$ component changes during the time element $dt$ by $$d_1R_x = -S_0 dt \cos C_r \qquad (1)$$

whereas $R_y$ changes by $$dR_y = -S_0 dt \sin C_r \qquad (2)$$

where $S_0$ is the instantaneous speed of the mother vessel and $C_r$ is the instantaneous relative course (the angle between the tangent to the mother vessel's course and the heading of the target as measured clockwise from the bow of the mother vessel). The minus sign in Equation 2 results from the fact that the rotation from the $x$-axis to the $y$-axis is taken as counterclockwise while $C_r$ is taken as clockwise.

The position keeper of Fig. 2 includes a potentiometer 10 which has its slider 11 moved by a servomotor SM1. This servomotor is controlled from the mother vessel's speedometer by means of a synchro SY1 and an amplifier Af1 so that the voltage between its output leads is maintained at a value proportional to $S_0$. The voltage $S_0$, which is proportional to the speed of the mother vessel, is applied to the stator winding 12 of an angle resolver R1 which has its rotor windings 13 and 14 positioned in accordance with the relative course $C_r$. For simplicity, here and in the following, isolating amplifiers are not shown in the drawing and not specifically mentioned. Such amplifiers may be used in order to feed a reatively low impedance member without loading the member which supplies the voltage. The angle resolver R1 thus yields voltages which are in acordance with Equations 1 and 2 proportional to $d_1R_x/dt$ and $dR_y/dt$, proper polarity of the output wires being assumed.

The voltage $dR_y/dt$ is applied to a speed servo SP1 which positions the slider 15 of a potentiometer P1. Assuming the slider 15 to be originally positioned at the right point, the voltage between the leads 16 and 17 will be kept continuously proportional to $R_y$.

From Fig. 1 it may be seen that $R_x$ is not only subject to the change $d_1R_x$ due to motion of the mother vessel, but also to the change $$d_2R_x = Sdt \qquad (3)$$

due to the motion of the target vessel. The $x$-axis of the coordinate system being parallel to the estimated heading of the target vessel, there is no component of the motion of the target vessel in the direction of the $y$-axis.

In order to take care of the change described by Equation 3, a voltage proportional to S is obtained from a potentiometer 18 which has its slider 19 positioned manually until the attached scale (not shown) shows the estimated value S of the speed of the target vessel.

This S voltage is connected in series with the winding 13 of the angle resolver R1 so that there is available between the leads 20 and 21 a voltage $$d_1R_x/dt + d_2R_x/dt = dR_x/dt \qquad (4)$$

This voltage controls a speed servo SP2 which positions the slider 22 on a potentiometer P2. With the slider 22 started at the correct position, the voltage on P2 will be continuously proportional to $R_x$.

The voltages $R_x$ and $R_y$ are applied to the stator windings 23 and 24 of an angle resolver R2 which includes the rotor coils 25 and 26. The voltage of the rotor coil 25 is fed into an amplifier Af2 which controls a servomotor SM2 in such a way that the amplifier input tends to go to zero. When this is accomplished, a voltage proportional to R is available at the output leads 27 and 28 of the coil 26 and the rotor of the angle solver R2 is positioned according to the "angle on the bow" A (Fig. 1) which is the angle between the vector from the mother vessel to the target and the $x$-axis of the coordinate system.

At the beginning of the operation, an estimated value of A is set up on a dial 29 by means of a knob K1. An estimated value of $B_r$ is set up on a dial 30 by means of a knob K2. The course $C_0$ of the mother vessel is obtained from the compass through a synchro SY2, an amplifier Af3 and a servomotor SM3. $C_0$ is combined with $B_r$ in a differential D3 to yield the true bearing B according to the equation $$C_0 + B_r = B \qquad (5)$$

A differential D2 combines B and A to yield the true target course C according to the equation $$C + A - B = 180° \qquad (6)$$

Since $$C_0 + C_r = C \qquad (7)$$

$C_r$ is readily obtained through a differential D1 for positioning the rotor of the angle resolver R1 as previously indicated.

During operation, the values of $C_0$ and A are continuously kept up to date by the compass and the servomotor SM2. C is assumed to be constant between observations, and the C shaft is locked by means of a brake 31. The motion of the A shaft is thus transmitted to the B and $B_r$ shafts, the latter also being influenced by the compass and $B_r$ is kept up to date. The compass also functions through the differential D1 to keep $C_r$ up to date.

The process of correcting the estimated values of target vessel speed and angle on the bow A during an observation is based on the conditions depicted by Fig. 3 wherein the data corresponding to the estimated motion of the target vessel is shown by full lines and the data corresponding to the actual motion of the target vessel is shown by dotted lines. During the first observation, the mother vessel was at E and the target vessel at G. Between the first and next observation, the mother vessel moved along a curved path to F. Based on the estimated data, the position keeper computed that the target vessel should be at H when the second observation is started. The position keeper thus set up the estimated range components $R_x$ and $R_y$ on the potentiometers P1 and P2. The "estimated" values of range and relative target bearing are R and $B_r$. The actual values are R' and $B_r'$ and the target vessel is actually at H'.

The process of correcting the estimated values involves two steps.

*Step No. 1*

The first step consists in (1) applying the observed R voltage through the leads 27 and 28 to the rotor coil 26 of the angle resolver R2 and (2)

connecting the input of the amplifier A$f$2 through a switch 32 to the rotor winding 33 of a synchro SY3. The switch portions corresponding to this step are indicated by dotted lines, those corresponding to the next step by dot-dashed lines, and those corresponding to the interval between two observations by full lines. This applies to all switches. This causes rotation of the servomotor SM2 which rotation is transmitted through the A, B and B$_r$ shafts to the rotor of the synchro SY3. This synchro is connected to periscope, radar or sonar and will balance in position corresponding to the observed value of the relative bearing B$_r$. The C shaft is still locked by the brake 31 and the C$_0$ shaft cannot be turned from the end looking into the differential D$_3$ because the gear train on SM3 is practically self-locking. Eventually the rotor of SY3 will come to a balance in a position corresponding to B$_r'$.

This operation involves rotation of both the B$_r$ and A shafts through the angle $\Delta$B$_r$. The angle between the rotor and stator of the angle resolver R2 is now A' (the angle between the observed range vector and the estimated heading of the target vessel). Thus, the voltages of the stator coils 23 and 24 of the angle resolver R2 correspond to the components R$_x'$ and R$_y'$ of the observed range vector, resolved with respect to the old coordinate system, the $x$-axis of which is the estimated target heading.

With switches 34 and 35 in the dotted position, voltages are generated between the ends of the stator coils 24 and 23 and the potentiometers P$_1$ and P$_2$, respectively. These voltages correspond to the difference between the observed and estimated values of the range components, and are thus proportional to the components $\Delta$R$_x$ and $\Delta$R$_y$ of the error vector HH', all taken with respect to the old coordinate system with the $x$-axis in the direction of the estimated heading of the target vessel.

The vector GH' is now the actual speed vector multiplied by the time $t$ between the first and second observation. It can be found by adding the vector HH' to the vector GH. The vector GH is the estimated speed multiplied by $t$.

Instead of finding GH', however, everything is divided by $t$ and the actual speed vector is found by subtracting HH'/$t$ from the estimated speed vector. The components $\Delta$R$_x$ and $\Delta$R$_y$ of HH' are divided by $t$ by the dividers Div. 1 and Div. 2. These dividers may be any well known type of voltage divider such as the one described in the patent to V. M. Cousins, No. 2,471,262.

The $x$-component of the estimated speed vector is S itself. To it, the value of $\Delta R_x/t$ is added. The resultant $x$-component of the actual target speed vector is fed into the rotor winding 36 of an angle resolver R3. The estimated target speed vector has no $y$-component, and the $y$-component of the actual speed vector of the target vessel is thus directly equal to $\Delta R_y/t$. This $\Delta R_y/t$ voltage is fed into the rotor winding 37 of the angle resolver R3.

An amplifier A$f$5 is connected across the stator coil 38 of an angle resolver R3. This amplifier applies its output potential to a servomotor SM5 which rotates the rotor of the angle resolver R3 until the amplifier input from the stator winding 38 is zero. When this happens, the angle $\epsilon$ is set up between the rotor and stator of R3. This angle $\epsilon$ is the angle between the estimated and the actual heading of the target vessel.

The output of the other stator coil 39 is equal to the actual absolute value of the speed of the target vessel. With switch 40 in the dotted position, a servomotor SM4 controlled by an amplifier A$f$4 drives the slider 19 of the potentiometer 18 until S is equal to the actual absolute value of the speed of the target vessel.

Step No. 2

The second step of correcting the estimated values of target vessel speed S and "angle on the bow" A during an observation consists of two simultaneous operations. The first of these operations involves transition from the old coordinate system with the $x$-axis parallel to the estimated heading of the target vessel to the new coordinate system with the $x$-axis parallel to the actual heading of the target vessel. The second of these operations involves producing across the potentiometers P$_1$ and P$_2$ voltages proportional to R$_x''$ and R$_y''$ which are based on the new coordinate system.

The first of these operations consists in applying a voltage to the rotor coil 36 of the angle resolver R3. The other rotor coil 37 does not obtain any voltage and the amplifier A$f$4 is disconnected from its stator coil 39 by means of a switch 40. The amplifier A$f$2 is connected to the stator coil 38 through switches located at the opposite ends of the leads 41 and 42 and a clutch C$_1$ is engaged to couple the shafts 43 and 44 together mechanically. Under these conditions, the servomotor SM2 drives the stator of the angle resolver R3 until it is lined up with the rotor. Thus the stator is turned by the angle $\epsilon$. The same rotation is applied to the A shaft which transforms the angle A' previously set up on this shaft into A'' which is the angle between the actual heading of the target vessel and the actual line of sight. The brake 31 on the C shaft is now released so that this shaft turns easier than the B and B$_r$ shafts. The angle $\epsilon$ is then used to correct the C and C$_r$ values.

With the angle A'' between the actual heading of the target vessel and the actual line of sight set up on the rotor of the angle resolver R2, the actual value of R is resolved into its R$_x''$ and R$_y''$ components with respect to the new coordinate system which has its $x$-axis in the direction of the actual target heading. The second operation of "Step No. 2" consists in setting up R$_x''$ and R$_y''$ on the potentiometers P$_1$ and P$_2$. This is accomplished by (1) feeding the resultant voltage difference of the stator winding 24 and the potentiometer P$_1$ through a lead 45 to the speed servo SP1 and (2) feeding the resultant voltage difference of the stator winding 23 and the potentiometer P$_2$ through a lead 46 to the speed servo SP2. These speed servos run until these resultant voltages are zero. This second operation of "Step No. 2" can be carried out simultaneously with the rotation of the A shaft through the angle $\epsilon$. Thus the sliders 15 and 22 will approach their correction positions while the rotor of the angle resolver R$_2$ assumes the correct orientation.

After "Step No. 2" is completed, the position keeper continuously computes the position of the target vessel until the next observation.

The angle solver

This part of the navigation computer solves a geometrical problem illustrated in Fig. 4. This figure refers to the bow tube from which some of the gyro controlled or guided vessels are launched. The stern tube is treated in an analogous way.

The torpedo or guided vessel leaves the bow tube which is displaced from the periscope, radar or sonar by the tube base line P in the direction of the heading of the mother vessel. It then travels in the direction of the course of the mother vessel for a distance M, called the reach. Then it goes on a circular arc with the radius Z. After turning by the gyro angle G, the guided vessel follows a straight path. (The angle G is the item to be computed.) The guided vessel contacts the target vessel at a point Q. V is the position of the target vessel at the instant when the guided vessel is launched or released. Q is displaced with respect to V in the direction of the heading of the target vessel by an amount $St$ where $t$ is the time required for the guided vessel to travel from the tube to the point of contact. This time is equal to the distance traveled by the guided vessel, plus a distance $U_y$ which corresponds to the time required to accelerate the guided vessel to running speed, divided by the speed of the guided vessel.

Fig. 5 shows the connections of the computer element by which the problem is solved. Voltages $R_x$ and $R_y$ are applied from the potentiometers $P_1$ and $P_2$ of the position keeper (Fig. 2). To the voltage $R_x$ is added algebraically a voltage $St$ which is obtained in a manner hereinafter described. This gives the components, with respect to the heading of the target vessel, of the vector from the periscope to the point of contact Q.

The components of the vector from the periscope, radar or sonar to the center W of the circular arc, with respect to the heading of the mother vessel, are $P+M$ and Z. $P+M$ is fed to the rotor winding 51 of an angle resolver R4 from the potentiometers 47 and 48 and Z is fed to the rotor winding 52 from an external source. An angle equal to the relative course $C_r$ is set up between the rotor and stator of the angle resolver R4. This angle is obtained from the corresponding shaft of the position keeper (Fig. 2). The voltages on the stator windings 53 and 54 of the angle resolver R4 are thus the components of the vector periscope-W, with respect to the heading of the target vessel. These components are subtracted from the above named components of the vector periscope-Q. This yields the components of the vector WQ, taken with respect to the heading of the target vessel.

These components are applied to the stator windings 55 and 56 of an angle resolver R5. If the angle between the stator and rotor of the angle resolver R5 is made equal to $C_r+G$, then the voltages set up on its rotor coils 57 and 58 are Z and the length of the final straight path of the guided vessel. Thus the output of the rotor coil 58 is bucked against a voltage Z. The resultant voltage difference functions through an amplifier A/6 to control a servomotor SM6 which drives the rotor of the angle resolver R5 until this difference is zero and the angle $C_r+G$, is set up on the shaft 59. A differential D4 having its shaft 60 positioned from the position keeper in accordance with $C_r$ then positions its shaft 61 in accordance with the gyro angle G.

It remains to show how the previously mentioned voltage $St$ is obtained. The total length of the path followed by the guided vessel consists of M, the arc $$\frac{\pi Z G}{180}$$

and the final straight path at the end of which it contacts the target vessel. To this is to be added the $U_y$ voltage which corresponds to the time required to accelerate the guided vessel to its running speed. Voltages corresponding to M and $U_y$ are obtained from the potentiometers 48 and 49. The arc length is obtained from the potentiometer 50, the total voltage of which is Z and the slider 62 of which is positioned according to G by a shaft 63. The length of the final straight path is obtained from the rotor winding 57 of the angle resolver R5.

The voltage thus obtained is fed to a divider Div. 3 through leads 64 and 65, where it is divided by $S_z$ which is the speed of the guided vessel. Divider Div. 3 may be the same type of divider as Div. 1 and Div. 2. The output of the divider Div. 3 is proportional to $t$ and is applied to a potentiometer 66 which has a slider 67 positioned according to S so that the voltage $St$ is made available at the leads 68 and 69. This voltage is utilized as previously indicated.

Thus, the invention provides an improved navigation computer and method of operation whereby the positional data of a moving target vessel is continuously estimated on the basis of a previous observation, is automatically corrected in accordance with data derived from a subsequent observation, and is utilized to launch a guided vessel on a course adapted to bring it into contact with the target vessel.

I claim as my invention:

1. In a computer for controlling the launching of a vessel to be guided from a mother vessel to a target vessel, means to establish first voltages which are values of the $x$ and $y$ components of an estimated initial range of the target vessel as resolved on a system of coordinates having its $x$ axis along the estimated course of said target vessel and its $y$ axis at right angles thereto, the combination of means controlled in accordance with the speeds of said target and mother vessel and with the relative course of said mother vessel to vary said first named means responsive thereto for producing voltages proportional to the $x$ and $y$ components of said target vessel's range subsequent to the time of establishment of said estimated initial range component voltages as resolved on said system of coordinates, and means responsive to said $x$ and $y$ component voltages for continuously estimating the value of said range and the value of the angle between said range and said $x$-axis.

2. In a computer for controlling the launching of a vessel to be guided from a mother vessel to a target vessel, means to establish first voltages which are values of the $x$ and $y$ components of an estimated initial range of the target vessel as resolved on a system of coordinates having its $x$ axis along the estimated course of said target vessel and its $y$ axis at right angles thereto, the combination of means controlled in accordance with the speeds of said target and mother vessel and with the relative course of said mother vessel to vary said first named means responsive thereto for producing voltages proportional to the $x$ and $y$ components of said target vessel's range subsequent to the time of establishment of said estimated initial range component voltages as resolved on said system of coordinates, and means responsive to said $x$ and $y$ component voltages for continuously estimating the value of said range in terms of voltage and the value of the angle between said range and said $x$-axis in terms of an angular displacement.

3. In a computer for controlling the gyro angle of a gyroscope by which a vessel is to be guided from a mother vessel to a target vessel, means to establish first voltages which are values of the $x$ and $y$ components of the estimated initial range of the target vessel as resolved on a system of coordinates having its $x$ axis along the estimated course of said target vessel and its $y$ axis at right angles thereto, a blockable shaft means controlled in accordance with shaft positions representative of the course and bearing of the mother vessel and a bow angle between the range vector and said $x$ axis to establish a shaft position at an angle representative of the instantaneous relative course, means controlled in accordance with the speeds of said target and said mother vessel and with said instantaneous relative course blockable shaft position to vary said first voltage establishing means to provide second voltages proportional to the $x$ and $y$ components of said target vessel range as resolved on said coordinate system for the given bow and bearing angles subsequent to the time of establishment of said initial range component voltages, means to correct for changes in said mother vessel bearing and in said bow angle between said range vector and $x$ axis while maintaining blocked said blockable means to establish said shaft position at an angle representative of said instantaneous relative course, means to establish a voltage proportional to the true range of said target vessel, means responsive to said bow angle shaft position to resolve said true range voltage into right angle voltage vector components, means to subtract said true range vector component voltages from said second voltages to provide voltages $\Delta x$ and $\Delta y$ representative of the error vectors in said $x$ and $y$ components, means to convert these error vector representative voltages into speed vector representative voltages $$\frac{\Delta x}{t} \text{ and } \frac{\Delta y}{t}$$

means to add said speed representative voltage $$\frac{\Delta x}{t}$$

to a voltage representative of the target vessel speed to obtain a resultant target speed vector voltage, means to position a shaft at a correction angle $\epsilon$ responsive to a vectorial combination of said speed representative voltage $$\frac{\Delta y}{t}$$

and said resultant target speed vector voltage, means to correct the input target speed to said computer in accordance with said vectorial combination, means to add to said bow angle shaft position an angle equal to said shaft correction angle $\epsilon$ while unblocking said means establishing said relative course angle shaft position to permit correction thereof, and means to control said first voltage establishing means responsive to said means responsive to said bow angle shaft position to resolve said true range voltages into right angle voltage components to establish voltages representative of the $x$ and $y$ components of said target range on a system of coordinates having its $x$ axis parallel to the actual heading of the target vessel at the time of said last true target range observation.

WILLIAM K. ERGEN.

REFERENCES CITED

The following references are of record in the file of this patent:

UNITED STATES PATENTS

| Number | Name | Date |
|---|---|---|
| 1,423,168 | Techel | July 18, 1922 |
| 1,943,403 | Watson | Jan. 11, 1934 |
| 2,402,024 | Crooke | June 11, 1946 |
| 2,402,088 | Ross | June 11, 1946 |
| 2,404,387 | Lovel | July 23, 1946 |
| 2,412,585 | Klemperer | Dec. 17, 1946 |
| 2,438,112 | Darlington | Mar. 23, 1948 |
| 2,439,381 | Darlington | Apr. 13, 1948 |
| 2,465,624 | Agins | Mar. 29, 1949 |